(No Model.)
T. A. EDISON.
ART OF GENERATING ELECTRICITY.
No. 490,953. Patented Jan. 31, 1893.
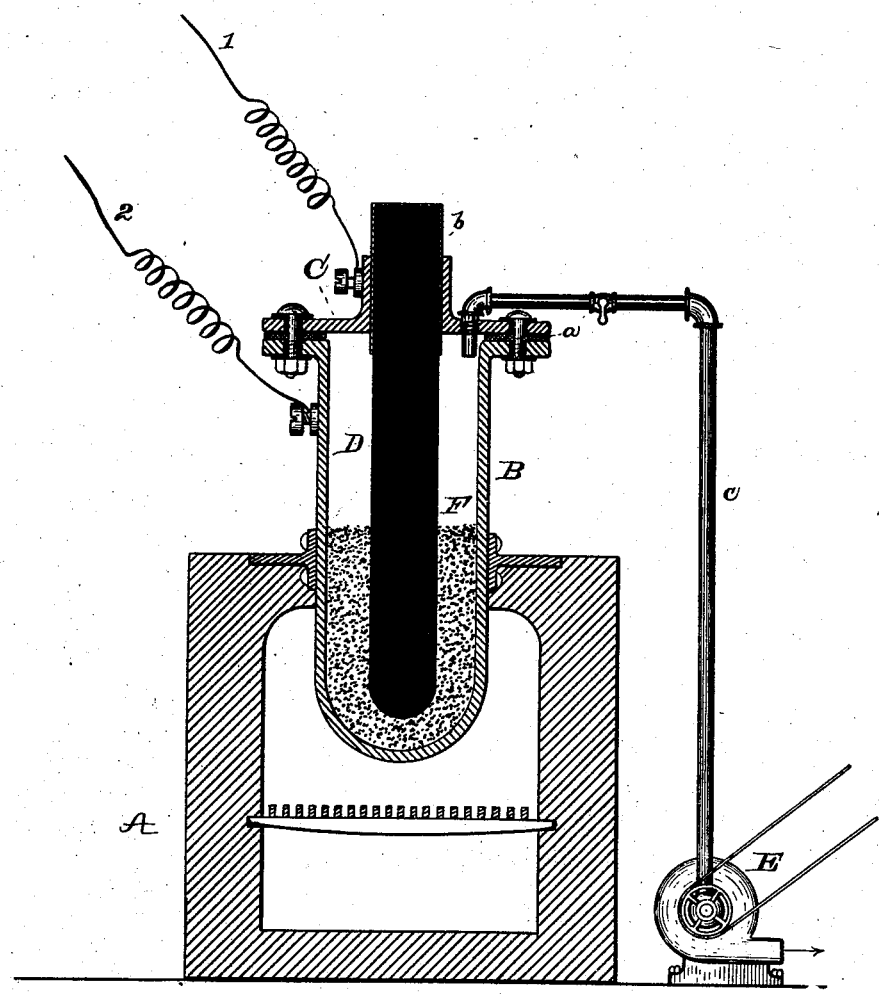
ATTEST:
E. C. Rowland
Edward N. Pyatt
INVENTOR:
Thomas A. Edison,
By Rich'd N. Dyer
Atty.

UNITED STATES PATENT OFFICE.

THOMAS A. EDISON, OF MENLO PARK, NEW JERSEY.

ART OF GENERATING ELECTRICITY.

SPECIFICATION forming part of Letters Patent No. 490,953, dated January 31, 1893.

Application filed November 1, 1883. Serial No. 110,550. (No specimens.)

*To all whom it may concern:*

Be it known that I, THOMAS A. EDISON, of Menlo Park, in the county of Middlesex and State of New Jersey, have invented a new and useful Improvement in the Art of Generating Electricity, (Case No. 599,) of which the following is a specification.

The object I have in view is to generate powerful continuous currents of electricity from the elements, and salts or compounds thereof, by dry chemical reaction, in a simple and efficient manner. This I accomplish by the use of positive and negative electrodes, placed in a chamber exhausted to the point where the gases generated by the reaction become good conductors of electricity, and subjecting such chamber to the action of heat, to assist the chemical reaction and increase the electrical conductivity of the gases, the positive and negative electrodes being surrounded by a decomposable dry chemical compound, which under the conditions of heat and rarefaction attacks the positive electrode and is decomposed, the reaction generating powerful continuous currents of electricity, which are utilized in a circuit in which the electrodes are located. For the positive electrode may be used any of the metals or metalloids, or carbon, the surrounding decomposable compound being an oxide, chloride, or other salt or compound of an element which will attack the positive electrode under the conditions imposed of heat and rarefaction, while the negative electrode can be any conducting element not attacked by the active compound used. If the result of the action of the compound on the positive electrode is a gas (as would be the case with a carbon electrode attacked by an oxide), the action may be cumulative, or reciprocal as will be presently explained, and a gas being generated the exhausting apparatus will have to be kept in operation continuously to maintain the desired degree of rarefaction: but, if the result of the action is a solid (as with a metal attacked by an oxide), the action would not be cumulative, and no gas being generated, only sufficient action of the exhausting apparatus would have to be maintained to overcome the leakage, and this might be done by a continuous or intermittent operation of the exhausting apparatus.

In carrying out my invention, I employ a suitable pot or vessel, for instance one of iron, having a tight cover, and connected with suitable exhausting apparatus for producing the proper degree of rarefaction therein. The iron pot may form the negative electrode of the apparatus. By the cover is supported the positive electrode of carbon, which makes good contact therewith and hangs down into the pot. This carbon electrode may be a cylinder made by compressing powdered bituminous coal and then coking the same slightly, the compression being continued during the coking, or a piece of wood may be carbonized under pressure to produce the electrode. The upper end of the electrode is copper-plated, to make a close fit with the sides of the opening in the cover through which it passes, and to make good electrical contact with such cover: or the cover may be solid and the carbon electrode be hung from the under side of the same.

The vessel is provided with a metallic oxide partly filling the same and surrounding the carbon electrode. Oxide of iron is suitable for the purpose. This vessel is mounted in a suitable furnace for giving the necessary heat to produce rapid chemical reaction. The temperature being raised to the point where the carbon will be attacked by oxygen, carbonic oxide will be formed, which being a powerful reducing agent will reduce the oxide of iron, producing metallic iron and carbonic acid. The carbonic acid will attack the carbon, consuming a portion thereof, forming carbonic oxide and changing the carbonic acid to carbonic oxide. The increased volume of carbonic oxide will act on the oxide of iron, reducing the oxide of iron and forming carbonic acid, which again attacks the carbon, and so on, this cumulative or reciprocal action continuing until the oxide of iron is all reduced or the carbon all consumed. While the cumulative action is taking place, the exhausting apparatus is kept in action, maintaining nearly or quite a definite degree of rarefaction in the vessel, which, with the heat, gives the gases high electrical conductivity, making possible the generation of powerful electrical currents by the cumulative dry chemical reaction described. When the result of the dry chemical reaction is a solid, or a gas which does not decompose the compound, the reaction will not be cumulative. For instance, the positive electrode might be a metal, as zinc, and the compound a metallic oxide, such as oxide of lead, the resulting oxide being a solid, but I prefer to use carbon and an oxide. The body of the vessel and the carbon form the two electrodes of the generating apparatus, and these being properly connected in a circuit, the powerful currents generated can be utilized as may be desired. A number of vessels of this character could be connected with the same circuit, in multiple arc, in series or in multiple series, according to the character of current it is desired to furnish.

In the accompanying drawing, forming a part hereof, the figure represents a vertical section and partial elevation of the apparatus.

A is a suitable furnace, upon which is mounted the iron pot B, having cover C secured tightly thereto but insulated therefrom by the packing $a$ of asbestus and cement.

D is the carbon cylinder, passing tightly through the cover, and having its upper end $b$ copper-plated for the purposes already stated.

E is an exhaust fan driven by any suitable source of power, and connected by a pipe $c$ with the interior of the vessel B.

F is the metallic oxide placed within the vessel around the carbon.

1 and 2 are the circuit connections.

What I claim, is:

1. The improvement in the art of generating electricity consisting in causing the dry decomposition of a chemical compound, in a rarefied atmosphere and in the presence of a positive element which is attacked by such compound and is electrically charged thereby, and a negative element which is electrically charged by the dry chemical reaction, substantially as set forth.

2. The improvement in the art of generating electricity, consisting in causing the dry decomposition of a chemical compound under conditions of heat and rarefaction, in the presence of a positive element which is attacked by such compound and is electrically charged thereby and a negative element which is electrically charged by the dry chemical reaction, substantially as set forth.

3. The improvement in the art of generating electricity, consisting in causing cumulative or reciprocal dry chemical reactions within a suitable vessel in the presence of electrodes electrically charged, thereby, substantially as set forth.

4. The improvement in the art of generating electricity, consisting in causing cumulative or reciprocal dry chemical reactions in a rarefied atmosphere, and in the presence of electrodes charged thereby, substantially as set forth.

5. The improvement in the art of generating electricity, consisting in causing cumulative or reciprocal dry chemical reactions under conditions of heat and rarefaction in the presence of electrodes charged thereby, substantially as set forth.

6. The improvement in the art of generating electricity, consisting in subjecting carbon to heat in an exhausted chamber and in the presence of an agent which combines therewith, substantially as set forth.

7. The improvement in the art of generating electricity, consisting in subjecting carbon to conditions of heat and rarefaction in the presence of a decomposable oxide, substantially as set forth.

8. The combination in electrical generating apparatus, of positive and negative electrodes, a surrounding decomposable compound, an inclosing chamber and exhausting apparatus, substantially as set forth.

9. The combination in electrical generating apparatus, of positive and negative electrodes, a surrounding decomposable compound, an inclosing chamber, exhausting apparatus and a furnace, substantially as set forth.

This specification signed and witnessed this 9th day of October, 1883.

THOS. A. EDISON.

Witnesses:
WM. H. MEADOWCROFT.
EDWARD H. PYATT.